Sept. 8, 1925.　　　　　　　　　　　　　　　　　　　　1,552,487
W. E. JOHNSTON
GRADOMETER
Filed Aug. 2, 1923

INVENTOR
Walter E. Johnston
BY
Adam E. Fisher
ATTORNEY

Patented Sept. 8, 1925.

1,552,487

UNITED STATES PATENT OFFICE.

WALTER E. JOHNSTON, OF YOUNGSTOWN, OHIO.

GRADOMETER.

Application filed August 2, 1923. Serial No. 655,278.

*To all whom it may concern:*

Be it known that I, WALTER E. JOHNSTON, a citizen of the United States, residing in the city of Youngstown, county of Mahoning, and State of Ohio, have invented new and useful Improvements in Gradometers, of which the following is a specification, reference being had to the accompanying drawings.

This invention pertains to gradometers, and the object is to provide a simple and efficient mechanical device for automatically readjusting the degree of grade upon which an automobile or other vehicle may be traveling.

In the drawing—

Figure 1:
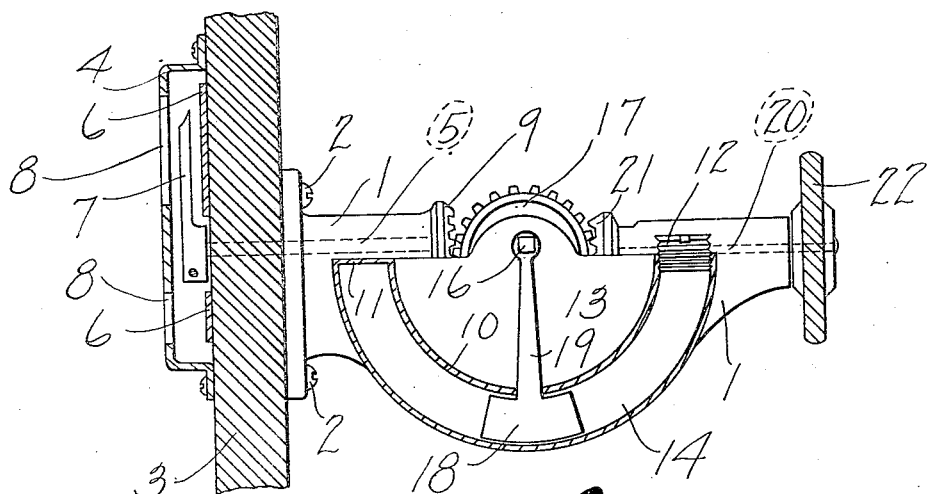
Figure 1 is a vertical, longitudinal section through the device as attached to the instrument board of an automobile.
Figure 2:
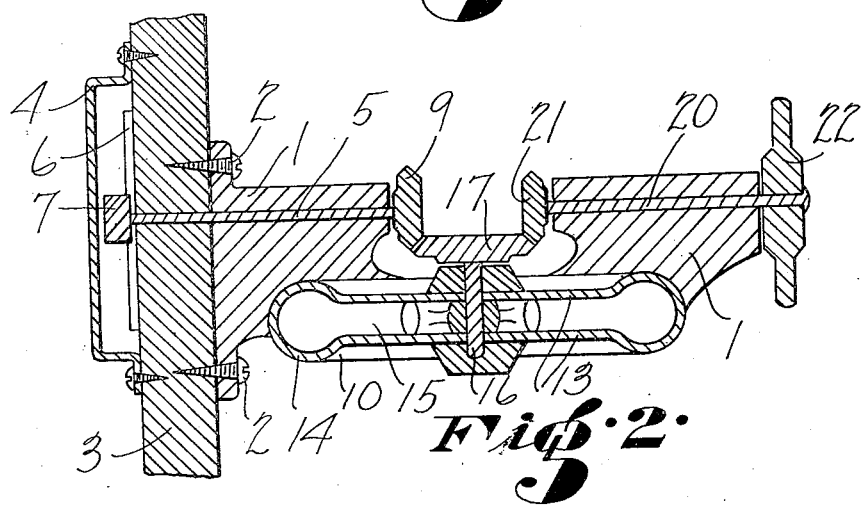
Figure 2 is a horizontal section.
Figure 3:
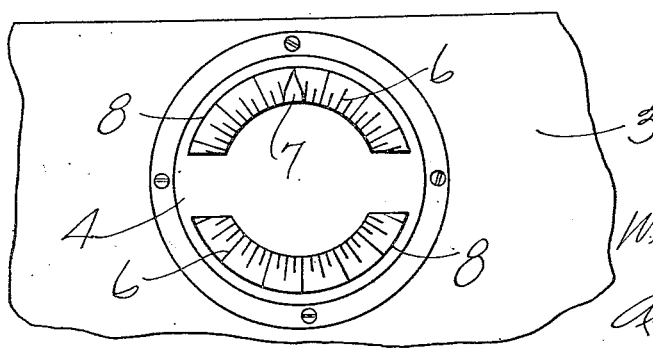
Figure 3 is a section of the instrument board showing the dial and indicator thereon.

The invention consists of a suitable supporting housing 1 mounted with screws 2 on the forward side of the instrument board 3, while on the back or outer face of the instrument board is mounted a dial and indicator housing 4 in alignment with the housing 1. An indicator shaft 5 is journaled through the supporting housing and through the instrument board, so that the back end is disposed within the housing 4 while the forward end extends through the housing 1. The shaft 5 pierces the instrument board perpendicularly. A dial 6, marked with the 360 degrees of a circle is mounted over the end of the shaft 5 within the housing 4, and the indicator hand 7 is rigidly mounted at this end of the shaft 5, so as to turn over the dial 6 within the housing 4. The housing 4 may have curved slots 8 cut therethrough to reveal the indicator hand, and its position relative to the dial. A beveled pinion gear 9 is mounted at the forward end of the shaft 5. Depending also from the housing 1 and to one side of the shaft 5, is an oil chamber 10, in the form of a sector, closed at one end 11, and having a screw cap 12 as a closure for the other end. This oil chamber is so located that the transverse axis thereof would meet perpendicularly the axis of the shaft 5; and it is constructed of two spaced sector webs 13 carrying on their peripheries a sector cylinder 14, having a slot 15, formed around its inner periphery between the webs 13. A pendulum shaft 16 is journaled through the axis of the oil chamber 10 and this shaft carries at its inner end a bevel gear 17 in mesh with the pinion gear 9.

A relatively heavy pendulum 18 is suspended by means of a thin shank 19 from the shaft 16 to which it is rigidly joined, while the pendulum 18 swings freely within the cylinder 14 to the general shape of which it conforms so as to substantially fill the interior thereof. The thin shank 19 plays between the webs 13. A fly-wheel shaft 20 is journaled in the housing 1 opposite to the shaft 5, and a beveled pinion 21 on the inner end of this shaft 20 meshes with the gear 17, while a fly-wheel 22 is mounted at the outer end of the shaft 20. A heavy oil is filled into the cylinder 14.

In use, the pendulum 18 will always, of course, stand approximately vertical on any grade, causing the indicator 7 in connection with the dial 6 to show the degree of the grade. The oil and fly-wheel act as stabilizers on the action of the pendulum to prevent its too sudden movement.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a device of the kind described, the combination with an instrument board of an automobile, of a supporting housing on the forward side of the instrument board; a dial and indicator housing on the opposite side thereof; an indicator shaft journaled through the instrument board and the supporting housing, with the back end disposed within the dial and indicator housing; an indicator hand at the rear end of the indicator shaft within the housing; a marked dial set over the end of the indicator shaft back of the indicator hand; a bevel pinion gear at the forward end of the indicator shaft; a sector oil chamber depending from the said supporting housing, same having an oil port and being formed with spaced sector-webs; a sector cylinder mounted on the peripheries of the sector-webs, the said cylinder having a slot cut around its inner periphery between the sector-webs; a pendulum shaft journaled through the axis of the oil chamber; a bevel gear at the inner end of said shaft in mesh with the pinion gear of the indicator shaft; a pendulum suspended in the oil cylinder; a thin shank extended between the sector-webs and rigidly joined at its ends to the said pendulum shaft and pendulum; a fly-wheel shaft journaled in the housing opposite to the indicator shaft; a pinion gear on the inner end of the fly-wheel shaft in mesh with the gear of the pendulum shaft; a fly-wheel at the outer end of the fly-wheel shaft.

WALTER E. JOHNSTON.